June 15, 1926. 1,589,274
G. H. WADSWORTH
TIRE SPREADING DEVICE
Filed Feb. 8, 1926
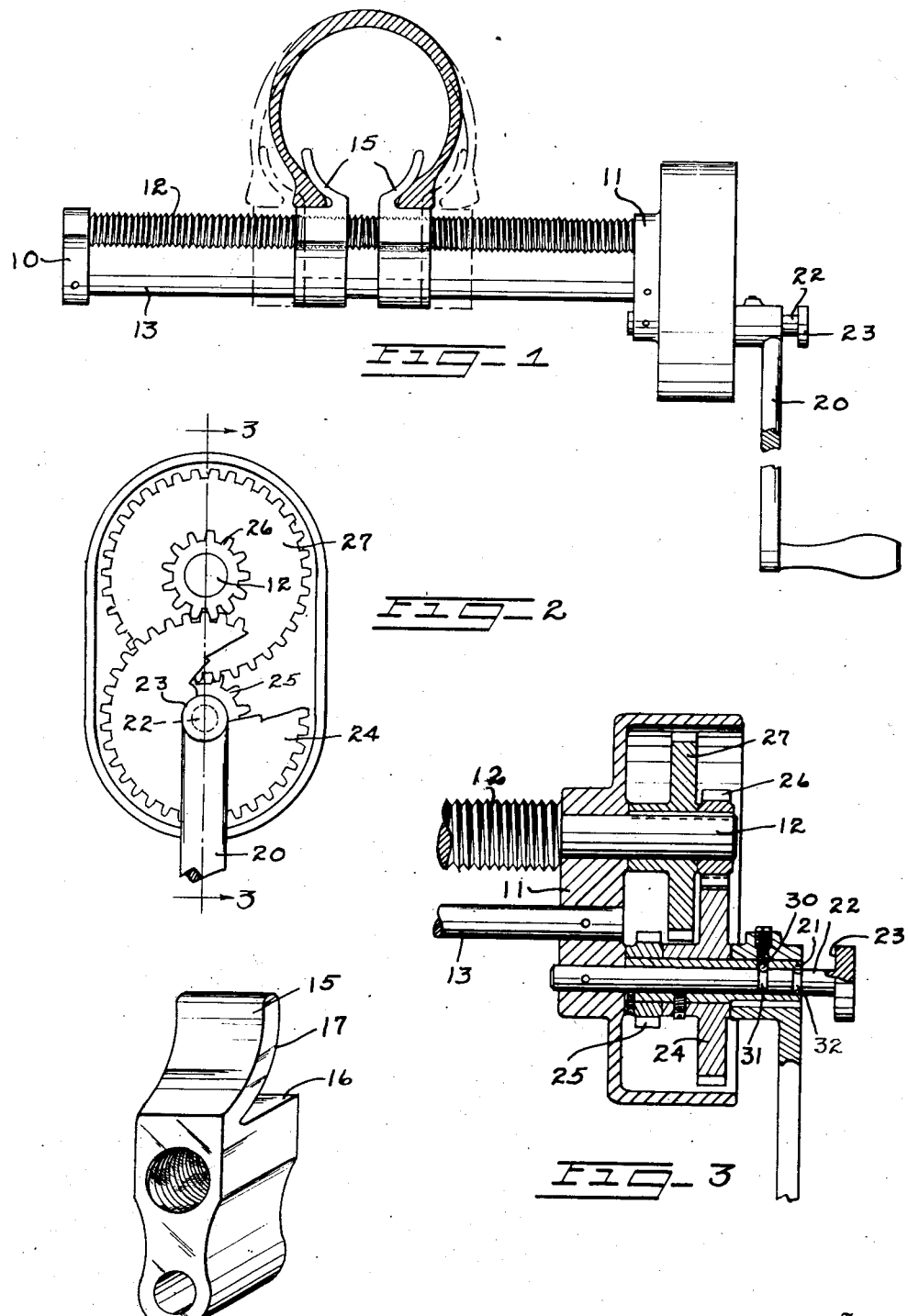
Inventor
George H. Wadsworth
By Baker, Macklin, Golrick & Hearn,
Attorneys Patented June 15, 1926.                                          1,589,274

UNITED STATES PATENT OFFICE.

GEORGE H. WADSWORTH, OF AKRON, OHIO, ASSIGNOR TO THE WADSWORTH CORE MACHINE & EQUIPMENT CO., OF AKRON, OHIO, A CORPORATION OF OHIO.

TIRE-SPREADING DEVICE.

Application filed February 8, 1926. Serial No. 86,819.

This invention relates to a tool which is particularly adapted for use in spreading the beads of a tire to make the interior of the tire accessible for inspection or repair.

Considerable difficulty has heretofore been experienced in prying apart the beads of a tire, particularly on heavy duty truck tires, and in holding the beads spaced apart sufficiently far to make the interior of the tire accessible for inspection or repair. Moreover there is some danger to the operator, if the means for holding the tire open, should be released during the repairing operation.

The principal object of the present invention is to provide a tool which will spread the beads of the tire quickly and effectively, and will hold the tire in such open position without danger to the workman until the tool has been manually actuated to release the pressure. In this connection, my invention contemplates a tool which is light in weight, and which does not occupy any appreciable space within the tire cavity during the spreading operation.

A further object of my invention is to make a tool which may be operated to obtain a relatively fast motion of the spreading jaws so long as no appreciable power is required to be exerted thereby. When the power is required, then I contemplate a mechanism which may be selectively operated to change the speed of the jaws to a relatively slow motion and thereby to increase the power of the tool. Thus the jaws may be quickly moved into engagement with the inner walls of the tire and then moved slowly to exert considerable pressure for spreading the tire beads. On withdrawing the tool from the tire, the higher speed can be employed so as to facilitate the removal operation.

A tool embodying my invention is illustrated in Fig. 1 in side elevation where a tire is shown in cross section in connection with the spreading jaws; Fig. 2 illustrates an end view of the tool from the actuating end thereof; Fig. 3 is a section taken through the tool on a place indicated by the line 3—3 in Fig. 2; and Fig. 4 is a perspective view of one of the spreading jaws.

My invention as illustrated, embodies two bearing blocks 10 and 11 between which a threaded shaft 12, and a smooth guide bar 13 are mounted. The shaft is rotatably mounted, while the guide bar 13 is non-rotatably mounted within the bearing blocks. Moreover the shaft has a right hand threaded portion for one half its length, and a left-hand threaded portion for the other half, as shown particularly in Fig. 1. A spreading jaw 15 is in threaded engagement with each threaded portion of the shaft and is in slidable engagement with the guide bar.

The frame jaws are each made as shown in Fig. 4 wherein a pocket is formed by a flat surface 16 and a curved surface 17 for receiving the tire bead. The curved surface is shaped to conform to the interior curvature of the tire, whereby the tire is prevented from slipping off the jaws during the spreading operation.

To rotate the shaft 12, and thereby to cause relative motion of the jaws along the shaft, I may employ a crank arm 20 which is adjacent one end of the shaft 12 and therefore is accessible for operation at the side of the tire which is being spread. In Fig. 3, the arm 20 is shown as being rigidly mounted upon the sleeve 21 which in turn is slidably mounted upon a stub shaft 22. The stub shaft as illustrated is rigidly connected at one end to the block 11, and at the other end is shown as having a shoulder 23 which is spaced from the arm 20. The sleeve 21 has attached thereto a gear 24 and a pinion 25, which are adapted to mesh respectively with a pinion 26 and a gear 27, which are rigidly mounted on the shaft 12. In Fig. 3, however, the gear 24 is shown as being in mesh with the pinion 26, while the pinion 25 is out of mesh with the gear 27. Under this condition the shaft 12 will be operated at a higher speed than the arm 20 and as a result the jaws will be spread at the relatively fast speed.

When it is desired to operate the jaws at slow speed, then the arm 20 together with the associated sleeve, gear, and pinion, are moved axially along the stub shaft until the pinion 25 meshes with the gear 27. This occurs when the arm engages the shoulder 23. To hold the arm in either position, I have shown a spring actuated member 30 which is mounted upon the hub of the arm and is adapted to engage an annular groove 31 or 32 in the stub shaft. When the member 30 is in engagement with the groove 32, then the pinion 25 is in engagement with the gear 27 and the gear 24 is out of mesh with the pinion 26. If the arm is then turned, the jaws 15 will be moved at a comparatively slow speed.

A tool made in accordance with my invention is particularly adapted for making the inner part of a tire accessible in an expeditious manner. The pitch of the threads on the shaft 12 is sufficient to lock the jaws against opening when the tire is spread to open position. Moreover the gear mechanism being selectively operable, enables the spreading jaws to be moved quickly so long as appreciable spreading power is not required, and then to be moved slowly for exerting considerable pressure against the beads of the tire. Upon releasing the tool the jaws may be moved at the higher speed, wherefore the tool may be quickly removed without danger to the workman.

I claim:

1. A tire spreading tool comprising in combination, a shaft having a right hand threaded portion and a left hand threaded portion, a jaw associated with each threaded portion, said jaws being adapted to engage the inside walls of a tire, and means adjacent one end of the shaft for rotating it and for effecting relative motion of said jaws along said shaft.

2. A tire spreading tool comprising in combination, a threaded shaft having right and left hand threaded portions, a jaw associated with each threaded portion, and a crank for rotating the shaft.

3. In combination, a shaft having a right hand threaded portion and a left hand threaded portion, a jaw associated with each threaded portion, a guide bar extending parallel to the axis of the shaft and being slidably engaged by each of said jaws when the shaft is rotated, but allowing movement of the jaws in a direction axially of the shaft, and means for rotating said shaft.

4. A tire spreading tool comprising in combination, spaced bearing blocks, a threaded shaft journaled in said blocks and extending therebetween, a guide member also extending between said blocks and parallel to the axis of the shaft, a jaw in threaded engagement with each threaded portion of said shaft, each jaw having a portion thereof slidably engaging said member, and a crank operatively associated with said shaft and mounted for turning movement outside one of said blocks.

5. A tire spreading tool comprising in combination, a pair of jaws adapted to engage the inner walls of a tire adjacent the bead portion thereof, a member operatively connected with one of the jaws for moving it with relation to the other jaw, a selective change speed gearing associated with said member for enabling the speed at which the jaw is moved to be varied, and means for actuating said gearing.

6. A tire spreading tool comprising in combination, a pair of jaws each adapted to engage the inner walls of a tire adjacent the bead portion thereof, a threaded shaft operatively connected with one of said jaws in such manner that rotation of the shaft effects movement of one jaw with reference to the other, gearing adjacent one end of the shaft and operatively connected thereto, and a crank arm beyond the end of the shaft for actuating the gearing.

7. A tire spreading tool comprising in combination, a rotatable shaft having a right hand threaded portion and a left hand threaded portion, a jaw associated with each threaded portion and adapted to engage the inner wall of the tire, a member extending parallel to the axis of the shaft and in engagement with said jaws for preventing rotation thereof whenever the shaft is rotated, but allowing movement in a direction parallel to the axis of the shaft, a gear and pinion associated with the shaft, a second gear and a pinion being shiftable as a unit and being adapted to mesh with the pinion and gear on the threaded shaft, there being only one gear and one pinion in mesh at one time, and means for enabling the second gear and pinion to be rotated as a unit.

8. In combination, two spaced bearing blocks, a threaded shaft journalled therein and having a right hand threaded portion, and a left hand threaded portion, a guide member extending parallel to the axis of the shaft, a jaw associated with each threaded portion and slidably mounted on the guide member, whereby rotation of the jaws is prevented, but movement in a direction axially of the shaft is permitted whenever the shaft is rotated, one of said blocks having an overhanging flange, a gear and a pinion rigidly mounted on the shaft within the confines of said flange, a second gear and pinion also mounted for rotation within the confines of said flange, the last mentioned gear and pinion being shiftable axially, whereby the first named gear may engage the second named pinion, or first named pinion may engage the second named gear, there being only one pinion and one gear in mesh at the same time, and a crank arm outside the flange for rotating the second named gear and pinion as a unit.

In testimony whereof, I hereunto affix my signature.

GEORGE H. WADSWORTH.

DISCLAIMER.

1,589,274.—*George H. Wadsworth*, Akron, Ohio. TIRE-SPREADING DEVICE. Patent dated June 15, 1926. Disclaimer filed June 14, 1927, by the patentee.

Therefore enters this disclaimer to that part of the claims in said specification, which is in the following words and numerals, to wit:

"1. A tire spreading tool comprising in combination, a shaft having a right hand threaded portion and a left hand threaded portion, a jaw associated with each threaded portion, said jaws being adapted to engage the inside walls of a tire, and means adjacent one end of the shaft for rotating it and for effecting relative motion of said jaws along said shaft.

"2. A tire spreading tool comprising in combination, a threaded shaft having right and left hand threaded portions, a jaw associated with each threaded portion, and a crank for rotating the shaft.

"3. In combination, a shaft having a right hand threaded portion and a left hand threaded portion, a jaw associated with each threaded portion, a guide bar extending parallel to the axis of the shaft and being slidably engaged by each of said jaws when the shaft is rotated, but allowing movement of the jaws in a direction axially of the shaft, and means for rotating said shaft.

"4. A tire spreading tool comprising in combination spaced bearing blocks, a threaded shaft journaled in said blocks and extending therebetween, a guide member also extending between said blocks and parallel to the axis of the shaft, a jaw in threaded engagement with each threaded portion of said shaft, each jaw having a portion thereof slidably engaging said member, and a crank operatively associated with said shaft and mounted for turning movement outside one of said blocks."

[*Official Gazette June 28, 1927.*]